J. C. BELL.
ROLL GRADING MACHINE.
APPLICATION FILED APR. 7, 1914.
1,104,727.
Patented July 21, 1914.
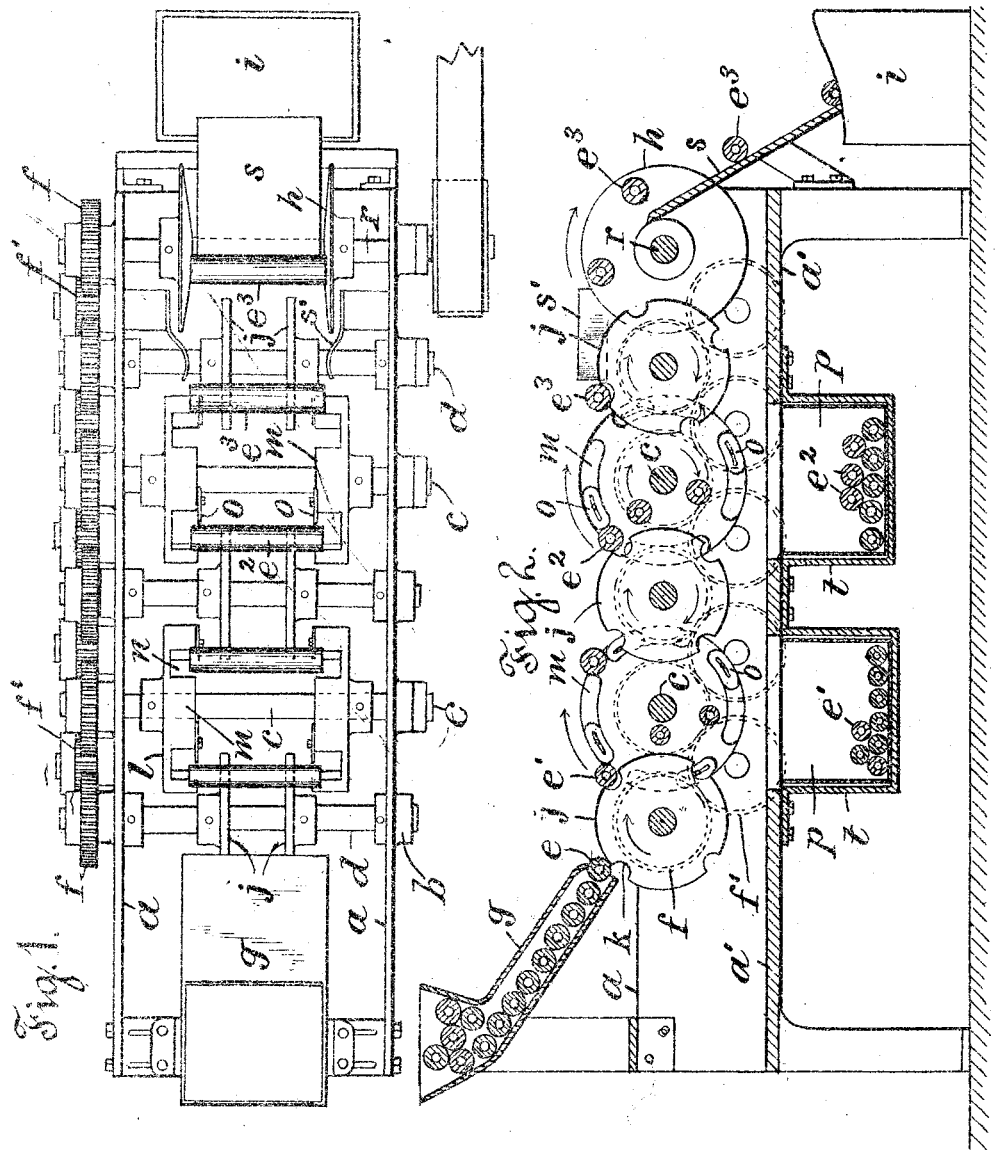

UNITED STATES PATENT OFFICE.

JOHN C. BELL, OF HARRISON, NEW JERSEY, ASSIGNOR TO HYATT ROLLER BEARING COMPANY, OF HARRISON, NEW JERSEY, A CORPORATION OF NEW JERSEY.

ROLL-GRADING MACHINE.

1,104,727.    Specification of Letters Patent.    Patented July 21, 1914.

Application filed April 7, 1914. Serial No. 830,107.

*To all whom it may concern:*

Be it known that I, JOHN C. BELL, a citizen of the United States, residing at 12 Ann street, Harrison, county of Hudson, and State of New Jersey, have invented certain new and useful Improvements in Roll-Grading Machines, fully described and represented in the following specification and the accompanying drawings, forming a part of the same.

This invention relates to a means for grading and separating rolls of different diameters which have been produced or mixed in process of manufacture and from which it is desired to separate those of standard size.

By re-duplicating certain parts of the apparatus, it may operate to grade the rolls into a series of sizes and finally discard to a storage-box the rolls which are undesirable because of excessive size.

The means for gaging the rolls consists of two heads having flanges projected toward one another such flanges being formed with notches proportioned to pass rolls of a given size, such rolls dropping between the heads as they rotate and escaping through any of the notches upon the lower sides of the heads and dropping into a receptacle for such gaged rolls. The rolls which are unable to pass through the notches are taken from the periphery of the carrier by a rotating shifter, consisting of disks with notches in the edges, which disks deliver the rolls to a succeeding carrier having slightly wider notches, through which a larger grade of rolls can pass and escape into a different receptacle. The rolls unable to pass through the notches of the second carrier may be graded again or discarded as of excessive diameter.

A shifter similar to that just described is preferably used to receive the rolls from the hopper and deliver them to the first gage-carrier, and also to take discarded rolls from the last gage-carrier and deliver them to a storage-box.

The invention will be understood by reference to the annexed drawing, in which—

Figure 1 is a plan of a grading machine embodying the improvements; and Fig. 2 is a longitudinal section of the same at the center line of Fig. 1.

The machine is shown with side-frames $a$ having bearings $b$ in which shafts $c$ are journaled for the gage-carriers, and shafts $d$ are journaled for the shifters. All the shafts are geared together by gears $f$ and intermediate gears $f'$ which cause all the shafts to rotate in the same direction, to carry the rolls from a hopper $g$ at one end of the machine to a delivery-disk $h$ at the opposite end which discharges the discarded rolls into a storage-box $i$.

The shifters are shown in Figs. 1 and 2, formed with disks $j$ having notches $k$ upon the margin adapted to receive rolls $e$ from the hopper $g$, and to deliver them to the gaging-jaws of the gage-carriers. The gage-carriers are shown with two circular heads $l$ spaced apart upon the shaft $c$ at a sufficient distance to let the gaged rolls drop freely between such heads, and segments $m$ are projected inwardly from the opposed faces of the heads. The adjacent ends of the segments form gage-jaws $n$ adjusted to gage the ends of the rolls and to pass those of a given size.

Dogs or movable jaws $o$ are fixed adjustably upon the segments to project more or less across the space between their ends, to vary such space in the desired degree, and such jaws may be adjusted to pass rolls of any given size, by setting such a roll within the space and securing the movable jaw in contact with the roll. The ends of the segments and the ends of the jaws are rounded upon both their inner and outer sides, as shown in Fig. 2, so as to permit the rolls to drop into the spaces when delivered thereto by the shifter, and to pass through the gage formed by the jaw $o$ if the rolls are of suitable diameter.

The hopper is shown of the width required to carry rolls of a certain length, and the heads $l$ of the gage-carrier are shown adjusted, so that the jaws $o$ bear upon the rolls quite near their ends, thus permitting the rolls when they pass through the jaws to fall freely between the heads and escape from the other spaces in the segments into a receptacle $p$ below the rotating gage-carrier.

The drawing shows two gage-carriers only, one adapted to pass rolls $e'$ of standard size, and the next adapted to pass rolls $e^2$ which differ from the standard within a certain limit; but it is obvious that other gage-carriers may be added to the series of two so as to divide the rolls into a greater number of grades. The rolls $e^3$ discarded by the last gage-carrier of the series, on account of their excessive size, are delivered to a storage-box and may, if desired, be afterward reduced to standard size by grinding or other suitable means. Such storage-box might be placed below the delivery-side of the last shifter for the rolls to drop therefrom into the box, but to insure the positive delivery of the rolls from the shifter-disks, means for their removal is provided, consisting of two guides $s'$ and two plates $h$ rotatable with a shaft $r$ and slightly convex upon their adjacent sides. These plates are set even with the ends of the rolls and overlap the edges of the shifter-disks, and the rolls $e^3$ carried by such disks are gradually crowded between the conical faces of the discharger which engages them with sufficient firmness to lift them from the disks. A stripper in the form of a delivery-board $s$ is supported between the plates $h$ to strip the rolls therefrom and discharge them into the box $i$. The receptacles $p$ are shown as drawers mounted in brackets $t$ upon the bed-plate $a'$ which supports the side-frames of the machine.

It will be understood that the essential feature of the invention is the use of rotary gage-carriers having gaging-jaws through which rolls of definite size may drop, and means for delivering the rolls automatically to such gage-carriers and removing therefrom the rolls which are above the desired gage. The rotary gage-carrier may therefore be modified in construction without departing from the invention, provided it carries gages to which the rolls may be delivered, and through which they may drop automatically.

Having thus set forth the nature of the invention what is claimed herein is:

1. In a roll-grading machine, a rotary roll-gage-carrier having two heads provided with roll-gages at different points upon their opposite faces, such gages being formed of jaws with spaces between the jaws permitting the passage of the standard rolls, in combination with a receptacle for the standard rolls, and with means for delivering rolls for gaging at the upper sides of the heads with the ends of the rolls over the said spaces, whereby the rolls of standard size fall through the spaces between the heads and are collected in the receptacle.

2. In a roll-grading machine, the combination, with a rotary roll-gage-carrier having two heads provided with roll-gages at different points upon their opposite faces, such gages having spaces permitting the passage of the standard rolls, of a receptacle for the standard rolls, and means for delivering rolls for gaging, transverse to such heads, with their ends over the said notches, whereby the rolls of standard size fall through the gaging-spaces into the space between the heads and thence through gaging-spaces at the bottom of the heads, and are collected in the receptacle.

3. In a roll-grading machine, the combination, with rotary gage-carriers having gaging-jaws, of a rotary shifter rotated in unison with the carriers and adapted to transport rolls from one of the carriers to another.

4. In a roll-grading machine, the combination, with rotary gage-carriers having gaging-jaws, of a rotary shifter adapted to receive the rolls and deliver them to the jaws of the first carrier, and a rotary shifter for delivering certain of the rolls from the first carrier to the second.

5. In a roll-grading machine, the combination, with a series of rotary gage-carriers having gaging-jaws, of a rotary shifter adapted to receive and deliver rolls to the first carrier, a rotary shifter to deliver certain rolls from one carrier of the series to another, and a rotary shifter operating to take the discarded rolls from the last carrier and discharge them from the machine.

6. In a roll-grading machine, a rotary gage-carrier consisting of two heads rotating in unison and having circular segments projected toward one another, provided with gaging-spaces adapted to gage and pass rolls of a given diameter, and jaws adjustable at the sides of the spaces to vary the gaging-spaces.

7. In a roll-grading machine, the combination, with two rotary gage-carriers, consisting each of two heads provided with gaging-jaws to pass rolls of given diameter, of a rotary shifter having disks rotated in unison with the carriers and having notches upon their edges adapted to take rolls from one of the carriers and deliver them to the other.

8. In a roll-grading machine, the combination, with a series of rotary gage-carriers having gaging-jaws arranged at opposite sides of the periphery to permit the passage of gaged rolls across the entire carrier, of a feeding-hopper, a series of rotary shifters with notches in their edges adapted to deliver rolls from the hopper to the first carrier and from one carrier to another and to finally deliver the discarded rolls to a storage-box, and receptacles below the gage-carriers to receive the gaged rolls therefrom.

In testimony whereof I have hereunto set my hand in the presence of two subscribing witnesses.

JOHN C. BELL.

Witnesses:
J. G. WEISS,
R. B. KING.